United States Patent

Rao et al.

Patent Number: 5,648,122
Date of Patent: Jul. 15, 1997

[54] USING ELECTRICAL DISCHARGE SURFACE PREPARATION FOR THERMAL COATINGS

[75] Inventors: V. Durga Nageswar Rao, Bloomfield Township; Robert Alan Rose, Groose Pointe Park; Robert S. Parsons, Canton; David Alan Yeager, Plymouth, all of Mich.

[73] Assignee: Ford Motor Company, Dearborn, Mich.

[21] Appl. No.: 314,014

[22] Filed: Sep. 28, 1994

[51] Int. Cl.⁶ .................................................. B05D 3/14
[52] U.S. Cl. .......................... 427/444; 427/456; 219/69.14; 219/69.16; 219/69.17; 219/69.18
[58] Field of Search ............................. 219/69.17, 69.18, 219/69.14, 69.16; 427/456, 444

[56] References Cited

U.S. PATENT DOCUMENTS

| | | |
|---|---|---|
| 3,451,871 | 6/1969 | Bauer et al. . |
| 3,626,137 | 12/1971 | Bertolasi et al. ................ 219/69 D |
| 4,219,718 | 8/1980 | Sato et al. . |
| 4,416,751 | 11/1983 | Berkowitz et al. .................. 204/165 |
| 4,488,882 | 12/1984 | Dausinger et al. . |
| 4,675,204 | 6/1987 | Nicoll et al. . |
| 4,735,678 | 4/1988 | Mandigo et al. ................. 219/69.17 |
| 5,358,753 | 10/1994 | Rao et al. .......................... 427/456 |

FOREIGN PATENT DOCUMENTS

| | | |
|---|---|---|
| 0 076 149 | 4/1983 | European Pat. Off. . |
| 0 568 315 | 11/1993 | European Pat. Off. . |
| 1293515 | 4/1969 | Germany . |
| 2112955 | 10/1971 | Germany . |
| 1687629 | 10/1991 | U.S.S.R. . |
| 2 272 453 | 5/1994 | United Kingdom . |

*Primary Examiner*—Katherine A. Bareford
*Attorney, Agent, or Firm*—Joseph W. Malleck

[57] ABSTRACT

A method of preparing the surface of a conductive metal to be non-smooth and non-passivated for reception of thermal sprayed coatings. The method comprises melting and rapidly solidifying globules of the surface by electrical discharge by bring an electrode (anode) in close gap-sparking proximity to the surface, filling the gap with an electrolyte containing a halogenated hydrocarbon fluid present in an amount of 2–5% of the electrolyte, and imposing a pulsed DC voltage (i.e. 20–100 volts at 40–200 amps) on the electrode to provide cyclical sparking between the electrode and the surface through the electrolyte resulting in a breakdown of the hydrocarbon to release nascent halogen atoms which attack the surface to prevent passivation during melting and solidification of the globules. The electrolyte is preferably cooled to a temperature below 65° F. during the sparking, and the halogenated hydrocarbon is preferably present in a sufficient amount to attack silicon and aluminum, if such surface is an aluminum alloy containing silicon.

8 Claims, 4 Drawing Sheets

USING ELECTRICAL DISCHARGE SURFACE PREPARATION FOR THERMAL COATINGS

BACKGROUND OF THE INVENTION

1. Technical Field

This invention relates to the technology of preparing surfaces to accept sprayed coatings, and more particularly to the use of electrical discharge for roughening surfaces to promote a mechanical bond with such coatings.

2. Discussion of the Prior Art

Surfaces to be commercially thermally coated have been previously prepared by the prior art by essentially 3 types of preparation: grit blasting, high pressure water jetting, and high frequency magnetic field. Grit blasting requires a high pressure flow of a fluid medium to carry the grit to the surface to be roughened. The flow must have a high pressure, usually greater than 15 psi; it utilizes a grit medium such as silica sand, aluminum oxide, chilled iron or garnet to produce a roughened surface. After grit blasting, the surface must be cleansed of the grit and dust before coating thereover. Grit blasting for high volume on-line manufacturing of thermal sprayed coated components is accompanied by the following concerns: grit contamination of the components and process equipment; difficulty of on-line collection and containment of the grit medium; grit blasting may not allow for highly accurate dimensional control; grit blasting is a line of sight process making surface preparation of complex components difficult; and sometimes reproducibility of surface roughness is difficult to achieve. Water jetting requires even higher pressures to impact the metal surface to dimple and abrade the surface. Such technique requires very high powered pumps, each of which are expensive and lack precise controllability of roughening.

Use of a high frequency magnetic field to disrupt the oxide film on a metal surface to be cleaned may be effective, but it is not particularly useful in creating a roughened surface. Acid etching has sometimes been utilized, but is troublesome because of the noxious content of the acid.

Although not used for surface roughening, electrical discharge machining has been utilized to create smooth metal surfaces or to cut smoothly through metals. Electrical discharge machining has been known for close to 50 years. A workpiece (usually the cathode) has material removed by it by an arc struck between a tool (electrode) and the workpiece to discharge electrical current. Every discharge pulse is like a miniature lightening bolt that melts, vaporizes and removes a minuscule portion of the workpiece without mechanical contact or stress supplied by the electrode on the workpiece. A dielectric liquid is used in the gap between the material to be eroded and the electrode. The liquid serves to carry away machined particles as the electrolyte flows through the gap. Electrical discharge machining has been developed to machine (cut and shape) relatively smooth surfaces (surface roughness under 10 micro inches) in metals having electrical resistivity under 300 ohms/cm. Such electrical discharge machining is not effective in creating a rough surface that locks coatings thereon because of the character of the resultant smooth surface. More importantly, when electrical discharge machining techniques are applied to aluminum or iron substrates, the resulting surface is burned or passivated, leaving an oxide film which is not smoothly dimpled, like an orange peel texture. Such passivated surface will not allow for proper adherence of a coating deposited thereover. This necessitates that the passivated surface must be removed, which can be accomplished by further grit blasting or acid dissolution techniques, both being undesirable and adding to the cost of the preparation.

SUMMARY OF THE INVENTION

It is an object of this invention to provide a more economical method of creating a non-smooth, non-passivated surface for mechanical bonding of thermal spray coatings on such surface.

This invention, in a first aspect, is a method of preparing the surface of a conductive metal for receiving thermal sprayed coatings, comprising: melting and rapidly solidifying globules of the surface by electrical discharge by: (a) bringing an electrode (anode) in close gap-sparking proximity to the surface, (b) filling the gap with an electrolyte containing a halogenated hydrocarbon fluid present in an amount of 2–5% of the electrolyte, and (c) imposing a pulsed DC voltage on the electrode to provide cyclical sparking between the electrode and the surface through the electrolyte resulting in a breakdown of the hydrocarbon to release nascent halogen atoms which attack the surface to prevent passivation during melting and solidification of the globules. Preferably, the electrolyte is cooled to a temperature below 65° F. during the sparking, and preferably the halogenated hydrocarbon is present in a sufficient amount to attack silicon and aluminum, if such surface is an aluminum alloy containing silicon.

DETAILED DESCRIPTION AND BEST MODE

Figure 1:
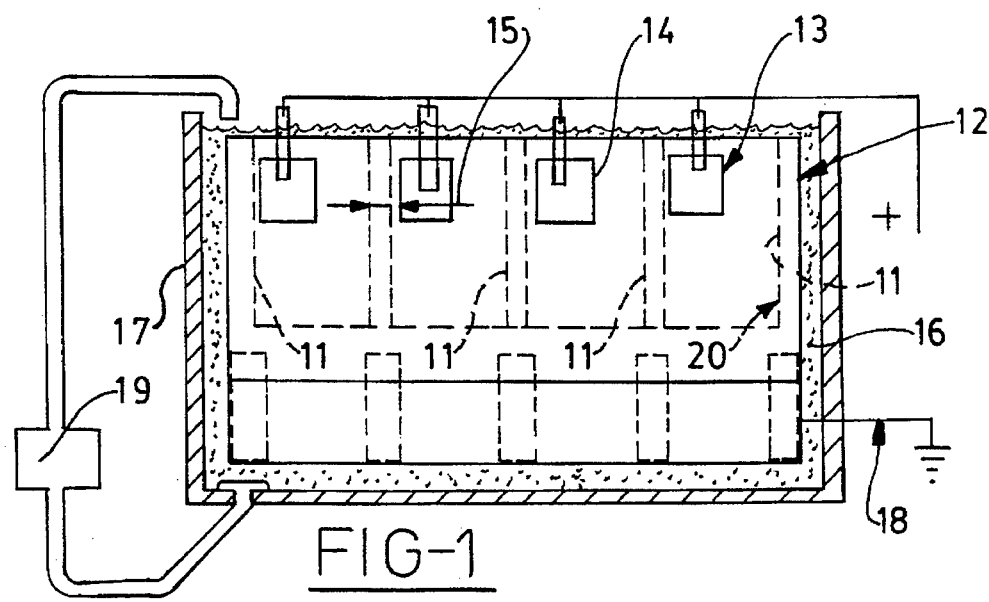
FIG. 1 is a schematic elevational sectional view a V-8 engine block showing a bank of electrical discharge electrodes (anodes) in place for carrying out spark erosion.

As shown in FIG. 1, the electrical discharge roughening method of this invention can be used to prepare the internal cylinder surfaces 11 of bores 20 of a nonferrous or aluminum engine block 12. To do so, a bank 13 of electrodes 14 (here four in number), each shaped complementary to the bore circumference, are supported for simultaneous insertion into the bores 20. Each electrode is carried in a manner to be in precise spaced relationship to the surface 11 during spark roughening, such spaced relationship being a gap 15 of about 40 mm. An electrolyte medium 16 will fill such arcuate gap between the electrodes and the metal wall surface 11 of each bore 20 to be eroded. The electrolyte is introduced into such gap when the block is immersed in a tank 17 containing such electrolyte. The electrolyte is circulated through a heat exchanger 19 to maintain its temperature at a low level such as about 65° F. The bore surfaces 11 are connected as a cathode in an electrical discharge circuit 18 and the anode electrodes 14 are positioned in close gaped relationship (gap 15) to the bore surfaces 11. The gap is filled with the electrolyte 16 containing a halogenated hydrocarbon in an amount of about 2–5% by volume of the electrolyte. An AC or DC voltage is imposed in the circuit in pulses between the cathode and anode to effect melting and resolidification of globules of the surface of bores 20.

Passivation is eliminated by the presence of the halogenated hydrogen. Passivation is defined herein to mean on oxidation or burning of the metal surface leaving an oxide film. It is created with conventional EDM when oxygen in the dielectric or electrolyte combines preferentially with the molecules of the surface being treated to promote an oxide layer that is dimpled like an orange peel. The passivation layer prevents adhesion of coatings thereon because of its very low surface energy and an occluded oxygenated surface layer.

Figure 2:
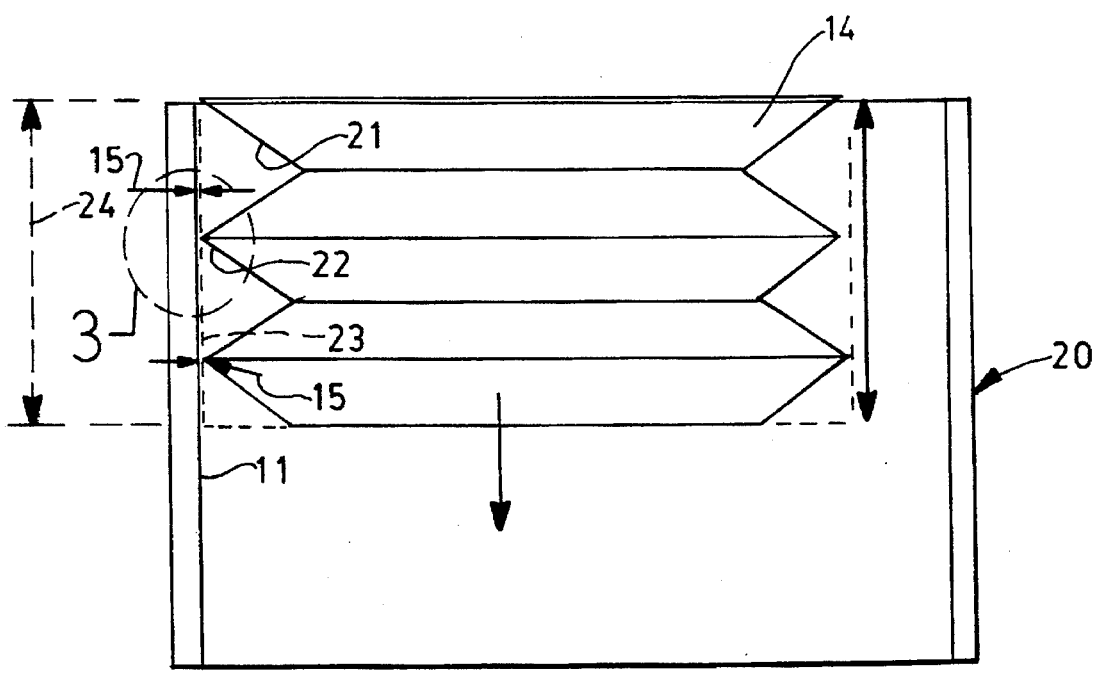
FIG. 2 is an enlarged schematic elevational view of a portion A of FIG. 1.

To facilitate the electron discharge sparking, the anode electrode may be serrated or spiraled (as in FIG. 2) to present ridges 22 lying in a common cylindrical envelope 23. The tips of the ridges are positioned to create the gap 15 (preferably 0.006–0.022 inches, which is equal to 275–325 microns). The length 24 of such electrode is moved along the surface 11 of bore in an circumferential as well as longitudinal manner to influence a desired area of the surface. The electrode 14 can be rotated to achieve such movement. However, if the surface to be coated is that of a bore liner to be inserted into the bore at some later stage, the liner can be preferentially rotated during electron discharge toughening.

Figure 3:
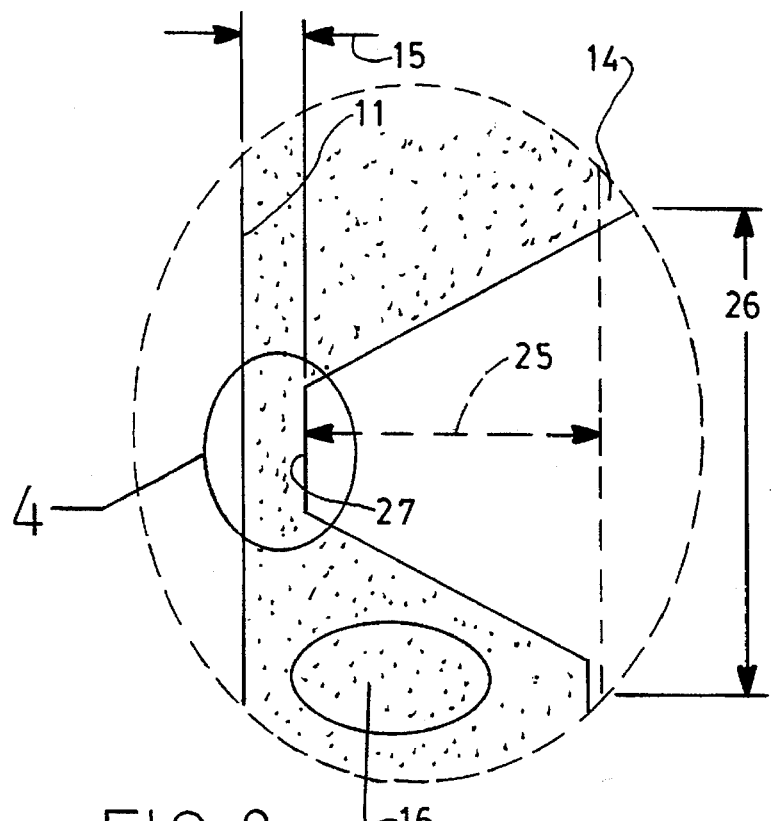
FIG. 3 is a further enlarged schematic portion of tip of the electrode of FIG. 2.

The electrolyte must be a fluid dielectric that is at least partially conductive such as a hydrocarbon fluid, including kerosene, benzene or freon. The dielectric can be water containing alkali impurities as long as the water deionizes quickly after electron discharge or sparking therethrough, and additionally acts as an insulator to slow the spread of the plasma for the next sparking pulse. As shown in FIG. 3 (which is an enlargement of zone A of FIG. 2), the height 25 of the ridges is preferably 225–375 microns, with the pitch 26 in the range of about 775–825 microns. The tip 27 of each ridge is preferably spaced a gap distance 15 of about 75–325 microns, although the gap can be as close as 40 microns.

Figure 4:
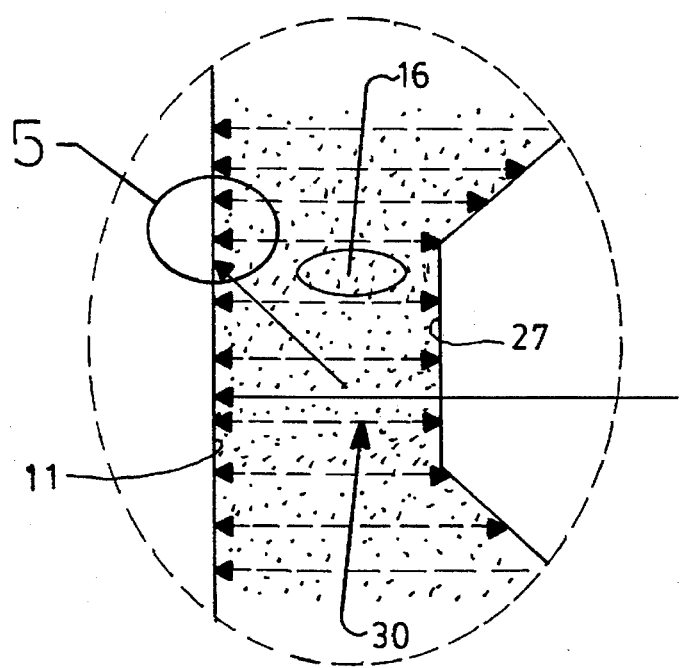
FIG. 4 is a schematic representation of the electrical effects in the electrolyte during sparking.

FIG. 4 enlarges zone B of FIG. 3 and illustrates how the electric field causes the conductive molecules of particles to form bridges 30 across the field in the gap which results in a breakdown of the dielectric 16. Voltage will fall to a lower level and current will increase to a constant level.

Figure 5:
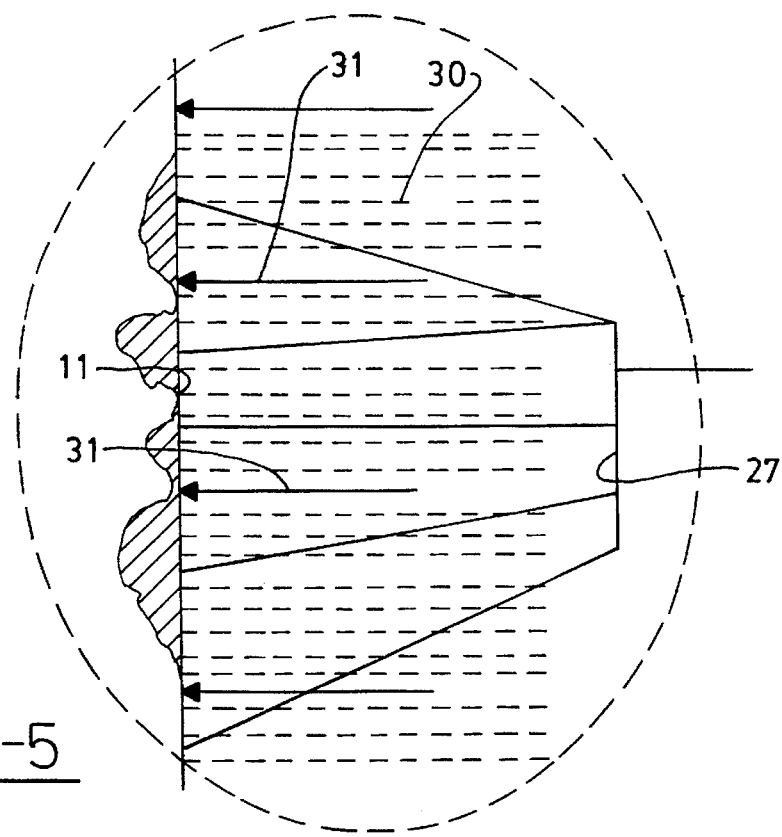
FIG. 5, is another schematic of the zone in FIG. 4 showing other phenomenon.

As shown in FIG. 5 (which is an enlargement of zone C of FIG. 4), high heat generation caused by electron discharge arcing 32 would normally cause surface passivation or other layer of formation on the surface 11. With the chemistry of the electrolyte of this invention, which provides for the presence of freon or halogenated hydrocarbons, such as carbon tetrachloride, the electrolyte will break down, releasing nascent molecules 31 of HF or HCl onto the workpiece surface 11 to combine with the freshly heated metal/metal oxide; the reaction products are washed away (fluxing away) to yield a chemically clean surface highly desirable for good coating adhesion with spray-type processes.

Figure 6:
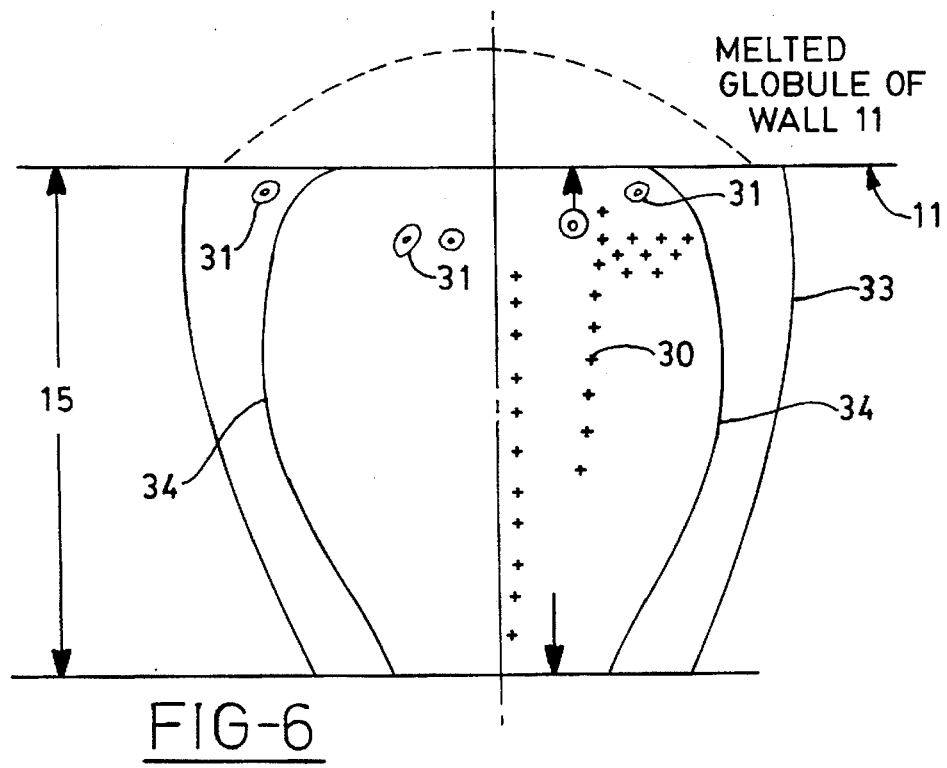
FIG. 6 is a schematic representation of the bubble created during sparking.

For purposes of illustration only, FIG. 6 shows how the plasma channel 33 grows during the pulse "on" time which is a flow of current through the electrolyte due to the bridges 30 that are formed. A vapor bubble 34 will form around the plasma channel 33 and the surrounding dense water or dielectric to restrict the plasma growth, concentrating the input energy to a very small volume. The plasma temperature may reach high levels such as 40,000 k, and the plasma pressure can rise to as much as 3 k bar. There will be an explosive melting and reforming of the metal material as a reduced heat input after the drop in current. As the current flow halts, the bubble implodes, thereby dislodging and reforming the molten material particles on surface 11. The dielectric fluid will solidify this molten material or globules by its temperature differential before such material can be carried away. The halogenated hydrocarbons breakdown, acting like a conventional flux, to prevent the formation of the occluded oxygen on the resolidified surface. Such cycle would be repeated during a subsequent "on" time of the pulsed current. It is important to realize that no machining takes place, that is, metal removed material is not taken away, only dislodged and reformed.

To achieve this type of metal roughening, the electrical discharge should be run at very low voltages, such as 20–100 volts, with a current amperage at a relatively high level of 40–200 amps, and relatively long on-off spark erosion times (on the order of 100–150 microseconds per spark). Travel of the electrode across the surface to be roughened should be relatively fast such as at the rate of 15 to 30 ft/minute.

Figure 7:
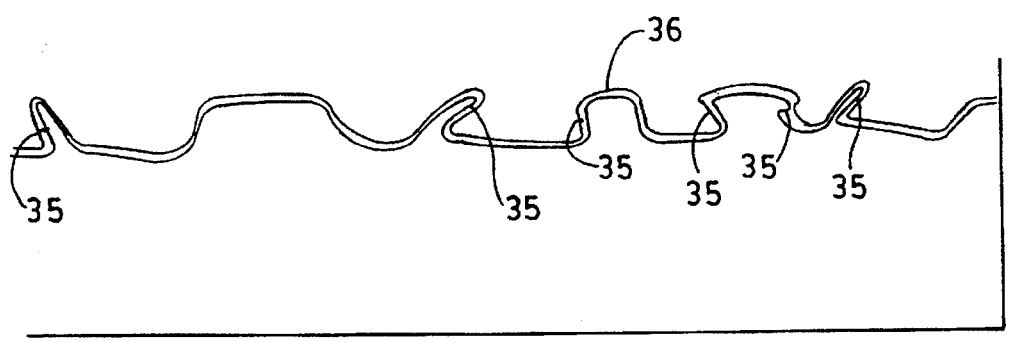
FIGS. 7 and 8 are each a greatly enlarged representations of a roughened surface created by electrical discharge sparking, FIG. 7 being for a surface not utilizing the present invention, and FIG. 8 showing the effects of utilizing the present invention.
Figure 8:
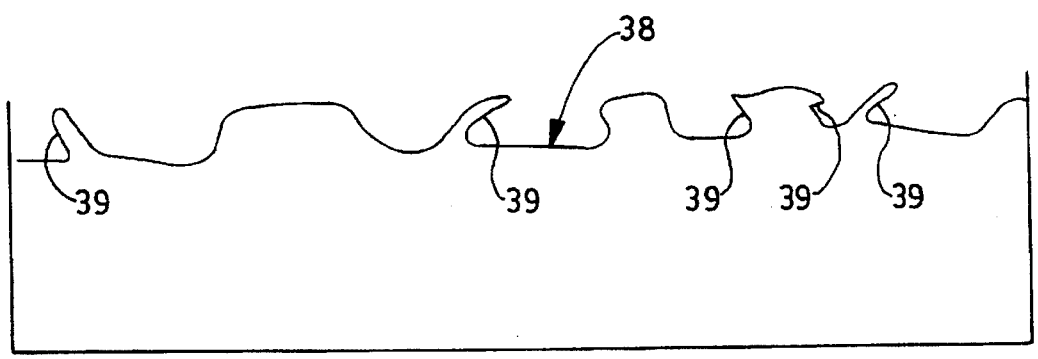

Comparative analysis of surfaces is prepared using electrical discharge roughening without passivation protection (as in FIG. 7) or by conventional machining (as in FIG. 9) versus the preparation in accordance with this invention (as in FIG. 8).

The surface in FIG. 7 shows a roughened surface with several undercut contours at 35. Unfortunately, all of the contours have a passivation layer 36 thereon resulting from burning of the aluminum surface using a water or kerosene dielectric; such passivation layer prevents adhesion of applied coatings because of molecular or chemical bonding is reduced or eliminated. Grit blasting of the passivated surface can remove the layer in areas that are not undercut, but in the undercut regions, the passivation layer remains and the ridges are usually folded over to close the undercut even more, making the undercuts more difficult to interlock with the coating applied thereover.

Figure 9:
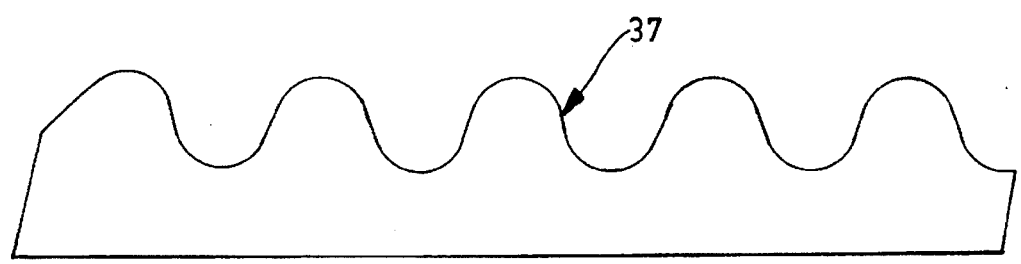
FIG. 9 is a schematic illustration of a surface created by conventional machining.

The surface contours of machining is shown on a very magnified cross-sectional basis in FIG. 9. It illustrates how rolling and smooth the machined surface 37 can be, resulting from the shearing action of a cutting tool. Such surface 37 does not promote mechanical interlocking with coating thereover.

The surface 38 in FIG. 8 is fresh, devoid of any passivation layer, and presents a random arrangement of rough surface undercuts 39 which promote coating interlock as well as promote chemical and diffusion-type bonding. In a conventional adhesion test using coating bond, as per ASTM test techniques, the coating of FIG. 8 registered an adhesion strength of at least 8000 psi.

We claim:

1. A method of preparing an electrically conductive surface for lockably receiving a thermally sprayed coating, comprising:

melting and solidifying at least one globule of said surface by spark erosion, said spark erosion being carried out by
(i) connecting the conductive surface as a cathode in a circuit;
(ii) positioning an anode electrode close to said conductive surface with a gap therebetween of 0.006–0.022 inches;

(iii) filling the gap with a dielectric containing 2–5% by volume of halogenated hydrocarbon that can break down to release nascent halogen atoms for effectively preventing passivation of said surface; and (iv) imposing a pulsed voltage through said dielectric between said cathode and anode to provide cyclical sparking therebetween that promotes melting and rapid solidification of said at least one globule without removal of metal and releases said nascent halogen, said dielectric being continuously cooled to dissipate the heat of sparking and promote controlled uniform roughening of said surface.

2. The method as in claim 1, in which said dielectric is water carrying alkali impurities to promote limited conductivity.

3. The method as in claim 1, in which said dielectric is a hydrocarbon fluid selected from the group consisting of kerosene, benzene, carbon tetrachloride, freon, and chloroethane.

4. The method as in claim 1, in which during step (iv), said anode is progressively moved to establish multiple sparking sites to roughen a larger defined area of said surface while maintaining said gap.

5. The method as in claim 1, in which said dielectric is continuously cooled to a temperature range of 50°–65° F.

6. The method as in claim 1, in which during step (iv), said voltage is in the range of 20–100 volts, with the current amperage being in the range of 40–200 amps, and the on-off spark erosion time for said voltage being during periods of 100–250 microseconds per spark.

7. The method as in claim 1, in which said electrically conductive surface is aluminum-based.

8. The method as in claim 1, in which said electrically conductive surface is an iron or copper base alloy.

* * * * *